United States Patent
Kang et al.

(10) Patent No.: US 9,413,741 B2
(45) Date of Patent: Aug. 9, 2016

(54) SYSTEM, APPARATUS, AND METHOD FOR SHARING ELECTRONIC DEVICE

(71) Applicant: Samsung Electronics Co., Ltd., Gyeonggi-do (KR)

(72) Inventors: Tae-Wook Kang, Gyeonggi-do (KR); Suk-Jin Sung, Gyeonggi-do (KR); So-Young Kim, Gyeonggi-do (KR); Ju-Hee Oh, Seoul (KR); Il-Han Yoon, Gyeongsangnam-do (KR); Yon-Gi Cho, Gyeonggi-do (KR); Young-Keun Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/462,789

(22) Filed: Aug. 19, 2014

(65) Prior Publication Data
US 2015/0058936 A1    Feb. 26, 2015

(30) Foreign Application Priority Data
Aug. 20, 2013    (KR) .......................... 10-2013-0098322

(51) Int. Cl.
*H04L 29/06*    (2006.01)

(52) U.S. Cl.
CPC ................ *H04L 63/08* (2013.01); *H04L 63/10* (2013.01)

(58) Field of Classification Search
CPC . H04L 63/08; H04L 63/0807; H04L 63/0823; H04L 63/083; H04L 63/0876; H04L 63/0884; H04L 63/10; G06F 21/00; G06F 21/30; G06F 21/31; G06F 21/33; G06F 21/335
USPC ............................................................ 726/4
See application file for complete search history.

(56) References Cited

U.S. PATENT DOCUMENTS

| | | | |
|---|---|---|---|
| 7,970,350 B2 | 6/2011 | Sheynman et al. | |
| 2007/0288637 A1* | 12/2007 | Layton | G06F 21/10 709/226 |
| 2008/0290987 A1 | 11/2008 | Li | |
| 2011/0231912 A1 | 9/2011 | Lee et al. | |
| 2012/0030318 A1 | 2/2012 | Ryder | |
| 2012/0060100 A1 | 3/2012 | Sherwood et al. | |
| 2013/0103797 A1 | 4/2013 | Park et al. | |
| 2013/0347117 A1* | 12/2013 | Parks | G06F 21/00 726/26 |
| 2014/0026193 A1* | 1/2014 | Saxman | G06F 21/33 726/4 |
| 2014/0053078 A1 | 2/2014 | Kannan | |
| 2014/0331297 A1* | 11/2014 | Innes | H04L 63/08 726/7 |

* cited by examiner

*Primary Examiner* — Yogesh Paliwal
(74) *Attorney, Agent, or Firm* — Cha & Reiter, LLC.

(57) ABSTRACT

A system, apparatus, and method for sharing content in an electronic device behaving as a cloud electronic device are provided. An electronic device behaving as a guest electronic device includes a controller to detect an input of account information associated with a manager electronic device. The controller of the guest electronic device transmits account information associated with the manager electronic device and accesses the cloud electronic device when the manager electronic device acknowledges the request.

17 Claims, 7 Drawing Sheets

SYSTEM, APPARATUS, AND METHOD FOR SHARING ELECTRONIC DEVICE

CROSS-REFERENCE TO RELATED APPLICATION(S)

This application claims the benefit under 35 U.S.C. §119 (a) of a Korean patent application filed in the Korean Intellectual Property Office on Aug. 20, 2013 and assigned Serial No. 10-2013-0098322, the entire disclosure of which is incorporated herein by reference.

TECHNICAL FIELD

The present disclosure relates generally to a system, apparatus, and method for sharing an electronic device, and more particularly, to a system, apparatus, and method for sharing an electronic device irrespective of time or place.

BACKGROUND

Advances in mobile communication and the exponential increase in mobile digital content, such as user-created photos, videos, text, music, and the like, has led to the popularity of content cloud services. Content cloud services may be provided through a public cloud server (using a public domain Internet Protocol (IP)). In order to provide content cloud services in personal electronic devices, personal electronic devices that function as a server, for example, are now being marketed. Such devices may behave as a Network Access Storage (NAS) (e.g., HomeSync or IPCamera).

A complex temporal or spatial constraint is imposed on an initial setup procedure for sharing a personal electronic device, for example, a cloud device. For example, if an electronic device is to share content with another personal electronic device, the electronic device may have to be within proximity of the other electronic device in order to conduct Near Field Communication (NFC) therewith. Furthermore, the sharing electronic device may have to input complex setting values.

SUMMARY

Aspects of the present disclosure address at least some of the above-mentioned problems and/or disadvantages. Accordingly, aspects of the present disclosure provide a system, apparatus, and method for sharing content in a personal electronic device irrespective of time or place.

In accordance with an aspect of the present disclosure, an electronic device may be provided. The electronic device may comprise a memory to store authentication information; and a controller to: detect an input of account information associated with a first electronic device; transmit, to an external device, a share request comprising a request to access at least some content in a second electronic device; transmit, to the external device, the account information associated with the first electronic device; and access the second electronic device such that the second electronic device shares at least some content therein, when an acknowledgement of the share request by the first electronic device is detected.

In accordance with another aspect of the present disclosure, there is provided a method for sharing an electronic device. The method may comprise detecting an input of account information associated with a first electronic device; transmitting, to an external device, a share request comprising a request to access at least some content in a second electronic device; transmitting, to the external device, the account information associated with the first electronic device; and accessing the second electronic device such that the second electronic device shares at least some content therein, when an acknowledgement of the share request by the first electronic device is detected.

Other aspects, advantages, and salient features of the disclosure will become apparent to those skilled in the art from the following detailed description and drawings.

BRIEF DESCRIPTION OF THE DRAWINGS

The above and other aspects, features and advantages of the present disclosure will be more apparent from the following description taken in conjunction with the accompanying drawings, in which.

Throughout the drawings, like reference numerals will be understood to refer to like parts, components, and structures.

DETAILED DESCRIPTION

The following description and accompanying drawings is provided to assist one of ordinary skill in the art to understand the examples of the disclosure as defined by the claims and their equivalents. It includes various specific details to assist in that understanding but these are to be regarded as mere illustrations. Accordingly, those of ordinary skilled in the art will recognize that various changes and modifications of the examples described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following examples of the present disclosure are provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device may include a portable terminal and a fixed terminal. The portable terminal may be an electronic device that may be readily carried with a user. The portable terminal may be any of a video phone, a portable phone, a smartphone, a Universal Mobile Telecommunications System (UMTS) terminal, a Personal Digital Assistant (PDA), a Portable Multimedia Player (PMP), a Digital Multimedia Broadcasting (DMB) terminal, an e-book reader, a laptop computer, a tablet, a digital camera, and the like. The fixed terminal may be a desktop Personal Computer (PC), a Network Access Storage (NAS), a file server, or the like.

Figure 1:
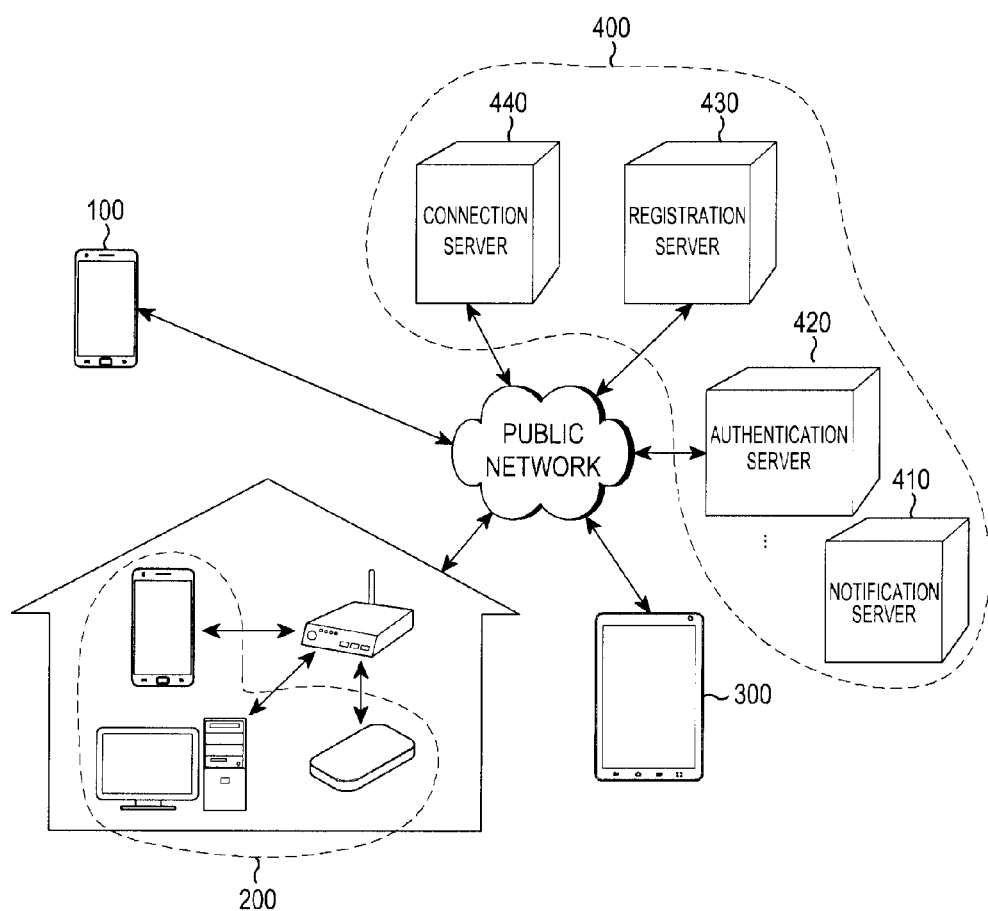
FIG. 1 illustrates a configuration of an example cloud device in accordance with aspects of the present disclosure.

FIG. 1 illustrates a configuration of an example cloud device sharing system in accordance with aspects of the present disclosure. In FIG. 1, the cloud device sharing system includes a first electronic device (hereinafter, referred to as a 'cloud device') 200 which may be shared between electronic devices, a second electronic device (hereinafter, referred to as a 'manager electronic device') 100 having at least one personal cloud device 200, a third electronic device (hereinafter, referred to as a 'guest electronic device') 300 that may request sharing of the at least one cloud device 200, and servers 400.

The manager electronic device 100 may communicate with a network using its unique device Identifier (ID) and Internet Protocol (IP) address and may log in to an authentication server 420. The manager electronic device 100 may receive unique device identification information from the at least one cloud device 200 by short-range communication such as Near Field Communication (NFC), BT, Barcode, and the like and may register the device identification information associated with the at least one cloud device 200 to its account in a registration server 430. As the registration server 430 assigns a peer Identifier (ID) to the manager electronic device 100, the manager electronic device 100 may be placed in a state where a Device to Device (D2D) connection may be established with the at least one cloud device 200.

The manager electronic device 100 may receive a share request notification message indicating a share request of a new guest electronic device 300 from the cloud device 200. If the share request of the guest electronic device 300 is acknowledged by a user, the cloud device 200 may transmit a share acknowledgement message. The manager electronic device 100 may receive authorization information requested by the guest electronic device 300 together with the share request notification message for the guest electronic device 300 from the cloud device 200. The authorization information and share request of the guest electronic device 300 may be acknowledged by the user. Then the cloud device 200 may transmit a message indicating acknowledgement of the authorization information and the share request.

The authorization information specifies a use range of the cloud device 200. The type of authorization information may vary in accordance with the types of personal cloud devices. For example, a cloud device comprising a storage medium may store specific content such as an image, a video, music, or text. Thus, authorization information for the cloud device may enable a guest device to read or write the specific content. In the case of an IP camera as a cloud device, functions such as camera on/off, video quality conversion, or event notification (changing a sound or a screen) may be enabled by the authorization information. For all cloud devices, power control such as a power saving mode may be enabled by the authorization information.

Upon receipt of the authorization information requested by the guest electronic device 300, the user of the manager electronic device 100 may acknowledge, restrict, or extend the authorization information and provide information associated with the acknowledgement, restriction, or extension of the authorization information to the guest electronic device 300.

If the user of the manager electronic device 100 has knowledge of account information (for example, an ID, an e-mail address, or a phone number) that identifies a user of the guest electronic device 300, the manager electronic device 100 may transmit a share invitation to the guest electronic device 300 through the registration server 430 using the user account information associated with the guest electronic device 300, so that the guest electronic device 300 may access at least some content in cloud device 200.

The manager electronic device 100 may receive authentication information (for example, Authcode) associated with the guest electronic device 300 as an acknowledgement of the share invitation through the registration server 430. Then the manager electronic device 100 may transmit the authentication information to the cloud device 200 so that the cloud device 200 may request the registration server 430 to register the authentication information to an account of the guest electronic device 300 in the registration server 430.

The cloud device 200 may be accessible to a user of a guest electronic device irrespective of place by IP communication and local communication (for example, Wireless Fidelity (WiFi), High Definition Multimedia Interface (HDMI), Bluetooth, NFC, or infrared communication).

The cloud device 200 may receive the authentication information associated with the guest electronic device 300 from the registration server 430. The cloud device 200 may secure an access token from the authentication server 420 using the authentication information. The cloud device 200 may transmit at least one of the share request notification message for the guest electronic device 300 and the authorization information. The cloud device 200 may receive the share acknowledgement message from the manager electronic device 100. The cloud device 200 may register to the account of the guest electronic device 300 in each of the registration server 430 and a connection server 440, using the access token.

The cloud device 200 may receive the authentication information associated with the guest electronic device 300 from the manager electronic device 100. The cloud device 200 may acquire the access token from the authentication server 420 using the authentication information and register to the account of the guest electronic device 300 in the registration server 430 and the connection server 440 using the access token.

The cloud device 200 may support multiple accounts and thus may service the multiple accounts simultaneously. For example, once a user of an electronic device having a plurality of accounts transmits the user's authentication information, the cloud device 200 may register information associated with the cloud device 200 to the accounts of the electronic device in the registration server 430 and the connection server 440. Thus, the cloud device 200 may establish D2D connections with electronic devices having accounts to which it has been registered. The cloud device 200 includes at least one of a storage device, a monitoring device, an electronic appliance, and other communication modules and thus may support multiple accounts for external communication.

Upon expiration of a valid duration of the access token due to inactivity for a predetermined time period (e.g., a month) after acquiring the access token for the account of the guest electronic device 300, the cloud device 200 may request new authentication information associated with the guest electronic device 300 and receive the new authentication information from the guest electronic device 300. As the cloud device 200 acquires a new access token using the received new authentication information, it may maintain its sharing service.

The guest electronic device 300 may be an electronic device of a user who wants access to content of another device not belonging to the user. The guest electronic device 300 may communicate with a network using a unique device ID and an IP address.

To use the cloud device sharing system, the guest electronic device 300 may log in to the manager electronic device 100 and the authentication server 420 and may acquire its authentication information from the authentication server 420 at a time when it wants to share a cloud device.

In one example, authentication information may be defined as a value by which a device grants another device a right to use a server using an ID of the device. The authentication information may be an encrypted combination of an ID and a PassWord (PW) of a user. The authentication information may be a value transmittable to another device under authorization of the authentication server 420. However, since the authentication information may be breached, the authentication information may only be valid for a short time duration.

The cloud device 200 may receive an access token from the authentication server 420 by transmitting the authentication information to the authentication server 420. Thereafter, the cloud device 200 may use the server system freely on behalf of the guest electronic device 300 that transmitted the authentication information to the cloud device 200. The cloud device 200 supporting multiple accounts may register to the registration server 430 and the connection server 440 through accounts of users that transmitted authentication information to the cloud device 200 and may establish D2D connections with devices of the registered multiple accounts.

Upon receipt of requested authentication information associated with the guest electronic device from the authentication server 420 after log-in to the authentication server 420, the guest electronic device 300 may transmit a cloud device share request including account information associated with the manager electronic device 100 and the authentication information to the registration server 142.

The account information associated with the manager electronic device 100 may be known to the user of the guest electronic device 300, including one of an ID, an e-mail address, and a phone number of the manager electronic device 100.

After log-in to the authentication server 420, the guest electronic device 300 may transmit a cloud device share request including the account information associated with the manager electronic device 100 to the authentication server 420 and the registration server 430.

Upon receipt of a cloud device share invitation including the account information associated with the manager electronic device 100 through the registration server 430, the guest electronic device 300 may transmit its authentication information acquired from the authentication server 420 as a response acknowledging the cloud device share invitation to the manager electronic device 100 through the registration server 430.

If the cloud device 100 registers to the account of the guest electronic device 300 in the registration server 430, the guest electronic device 300 may receive a message indicating that cloud device 200 is now sharing.

The servers 400 are external devices of the manager electronic device 100 or the guest electronic device 300. The servers 400 may be classified in terms of function or type. The servers 400 may be implemented as one physical server or physically separate servers.

If the servers 400 are classified in terms of function, the servers 400 may include a notification server 410, the authentication server 420, the registration server 430, and the connection server 440. The notification server 410 may perform a push function of transmitting messages without spatial constraints. The notification server 410 may transmit authentication information or authorization information to the cloud device 200, upon request of the registration server 430.

The authentication server 420 may manage accounts and may issue authentication information and access tokens for the accounts. The authentication server 420 may grant a right to use an overall service infrastructure by authentication.

If the logged-in guest electronic device 300 requests authentication information, the authentication server 420 may respond with an encrypted combination of the log-in ID and PW of the guest electronic device 300 as authentication information.

Upon receipt of a request for an access token and the authentication information associated with the guest electronic device 300 from the cloud device 200, the authentication server 420 may transmit an access token for accessing the account of the guest electronic device 300 to the cloud device 200 by verifying the authentication information.

The registration server 430 may manage device information and user information on an account basis.

Upon receipt of a cloud device share request and the account information associated with the manager electronic device 100 from the guest electronic device 300, the registration server 430 may check the at least one cloud device 200 registered to the account of the manager electronic device 100 based on the account information associated with the manager electronic device 100. The registration server 430 may also transmit the authentication information associated with the guest electronic device 300 to the cloud device 200 through the notification server 410.

Upon receipt of a cloud device share request and the account information associated with the manager electronic device 100 from the guest electronic device 300, the registration server 430 may check the at least one cloud device 200 registered to the account of the manager electronic device 100 based on the account information associated with the manager electronic device 100. The registration server 430 may also transmit the authentication information associated with the guest electronic device 300 received from the authentication server 420 to the cloud device 200 through the notification server 410.

Upon receipt of an access token acquired based on the authentication information associated with the guest electronic device 300 from the cloud device 200, the registration server 430 may register information associated with the cloud device 200 to the account of the guest electronic device 300 so that the cloud device 200 may be displayed by the guest electronic device 300. The connection server 440 may establish a D2D connection using Network Address Translation (NAT)-based technologies and may reinforce socket channel security.

Upon receipt of the access token acquired based on the authentication information associated with the guest electronic device 300 from the cloud device 200, the connection server 440 registers information associated with the cloud device 200 to the account of the guest electronic device 300 in the connection server 440 so as to establish D2D connections between the cloud device 200 and a plurality of devices registered to the accounts of the guest electronic device 300.

Figure 2:
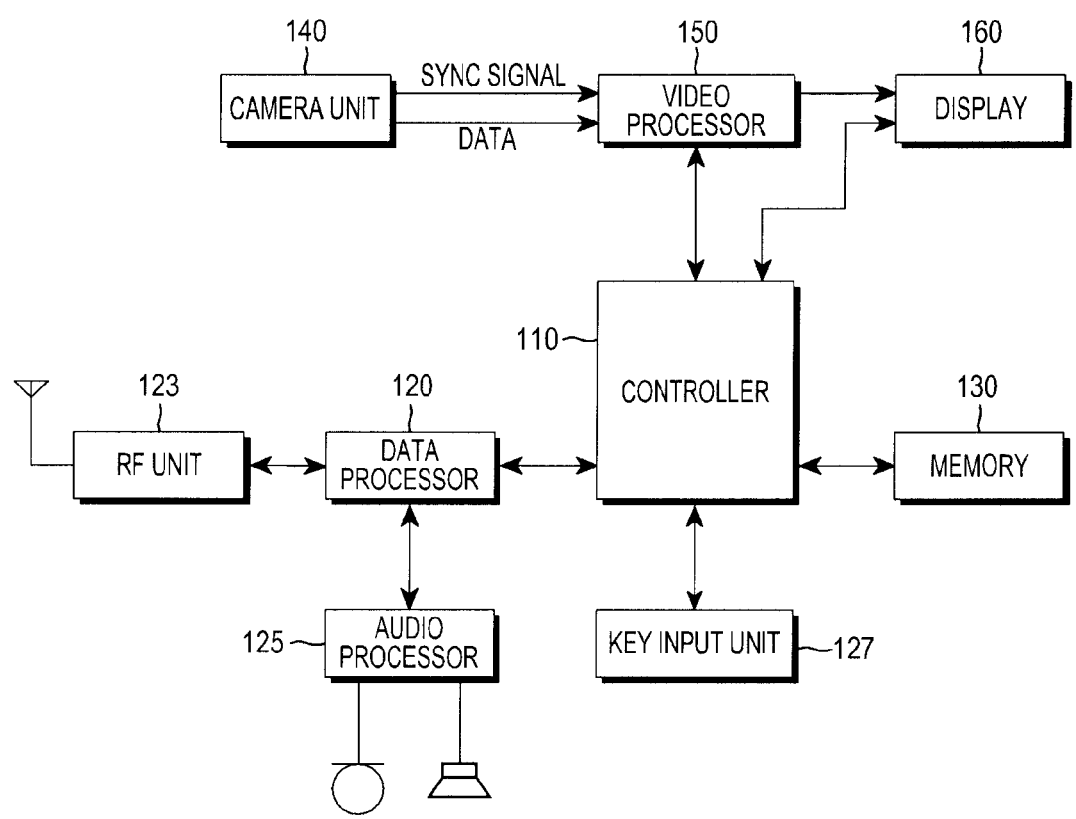
FIG. 2 is a block diagram of an example electronic device in accordance with aspects of the present disclosure.

Referring to FIG. 2, a block diagram of an example electronic device in accordance with aspects of the present disclosure is depicted. The electronic device may be the manager electronic device 100 or the guest electronic device 300. In the example shown in FIG. 2, a Radio Frequency (RF) unit 123 is responsible for wireless communication of the electronic device. The RF unit 123 may include an RF transmitter for upconverting the frequency of a transmission signal and amplifying the upconverted transmission signal, and an RF receiver for low-noise-amplifying a received signal and downconverting the frequency of the low-noise-amplified received signal.

A data processor 120 may include a transmitter for encoding and modulating the transmission signal, and a receiver for demodulating and decoding the received signal. Thus, the data processor 120 may include a Modulator/Demodulator (MODEM) and a Coder/Decoder (CODEC). The CODEC may include a data CODEC for processing packet data and the like, and an audio CODEC for processing an audio signal such as voice.

An audio processor 125 may play an audio signal received from the audio CODEC in the data processor 120, or may transmit a transmission audio signal picked up by a Microphone (MIC) to the audio CODEC in the data processor 120.

A key input unit 127 may include alphanumerical keys for entering numeric/character information, and function keys for setting various functions.

A memory 130 may include a program memory and a data memory. The program memory may store programs for controlling the overall operations of the electronic device, and programs for controlling sharing of a cloud device through servers. The data memory may temporarily store data generated during execution of the programs.

A controller 110 may control the overall operation of the electronic device. In one example, if the electronic device is the guest electronic device 300, the controller 110 may log in to the authentication server 420 and request authentication information (for example, Authcode) associated with the guest electronic device 300 to the authentication server 420, upon request.

Upon receipt of the requested authentication information from the authentication server 420, the controller 110 may transmit, to the registration server 430, a cloud device share request and the authentication information and management information (for example, an ID, an e-mail address, or a phone number) associated with the manager electronic device 100, known to the user of the guest electronic device 300.

In another example, controller 110 may transmit, to the registration server 430, the cloud device share request and the authentication information, the management information (for example, the ID, the e-mail address, or the phone number) associated with the manager electronic device 100, known to the user of the guest electronic device 300, and authorization information indicating a use range of the cloud device 200.

Upon receipt of a cloud device share invitation and the management information associated with the manager electronic device 100 through the registration server 430, controller 110 may log in to the authentication server 420. Once logged in, controller 110 may receive authentication information from the authentication server 420, transmit the authentication information as an acknowledgement of the cloud device share invitation to the manager electronic device 100 through the registration server 430.

In another example, if the electronic device is the manager electronic device 100, upon receipt of a share request notification message indicating a cloud device share request of the guest electronic device or authorization information requested by the guest electronic device 300 from the cloud device 200, the controller 110 may display the received message or information on the display 160. If the user acknowledges the share request or the authorization information, the controller 110 may transmit a share acknowledgement message to the cloud device 200 to indicate acknowledgement of the share request of the guest electronic device 300.

The controller 110 may transmit a cloud device share invitation to the guest electronic device 300 through the registration server 430. Upon receipt of authentication information from the guest electronic device 300 as an acknowledgement of the cloud device share invitation through the registration server 430, the controller 110 may transmit the authentication information to the cloud device 200 so that the cloud device 200 may be registered to an account of the guest electronic device 300 in the registration server 430 and the connection server 440.

In the example of FIG. 2, camera unit 140 may include a camera sensor that captures image data and converts a captured optical signal to an electrical signal and a signal processor that converts an analog video signal captured by the camera sensor to digital data. It is assumed that the camera sensor is a Charge Coupled Device (CCD) sensor or a Complementary Metal Oxide Semiconductor (CMOS) sensor. The signal sensor may be configured as a Digital Signal Processor (DSP). The camera sensor and the signal processor may be incorporated into a single device or may be configured separately.

In the present example of FIG. 2, video processor 150 may perform Image Signal Processing (ISP) to display an image signal received from the camera unit 140 on a display 160. The ISP includes image processing functions such as gamma correction, interpolation, spatial change, image effect, image scaling, Automatic White Balance (AWB), Automatic Exposure (AE), Automatic Focus (AF), and the like. The video processor 150 may process an image signal received from the camera unit 140 on a frame-by-frame basis and output the image frame data based on the characteristics and size of the display 160. The video processor 150 includes a video CODEC to compress image frame data to be displayed on the display 160 in a predetermined method and recovers (or decompress) compressed image frame data to original image frame data. The video CODEC may be a Joint Photographic Experts Group (JPEG) CODEC, a Moving Picture Experts Group 4 (MPEG4) CODEC, a Wavelet CODEC, or the like. The video processor 150 is assumed to have an On Screen Display (OSD) function, and may output OSD data based on the size of a displayed screen under control of the controller 110.

Furthermore, in this example shown in FIG. 2, display 160 displays an image signal received from the video processor 150 on a screen, and displays user data received from the controller 110. The display 160 may be configured with a Liquid Crystal Display (LCD). In this case, the display 160 may include an LCD controller, a memory that stores video data, and an LCD device. If the LCD is configured as a touch screen, the LCD may serve as an input unit. In this case, virtual keys as would be on the keypad 127 may be displayed on the display 160.

If the display unit 160 is used as a touch screen unit as it is implemented in a touch screen manner, the touch screen unit may include a Touch Screen Panel (TSP) with a plurality of sensor panels. The sensor panels may include a capacitive sensor panel that senses a coarse touch by fingertips, and an electromagnetic induction sensor panel that senses a fine touch such as a touch of a touch pen.

Figure 3:
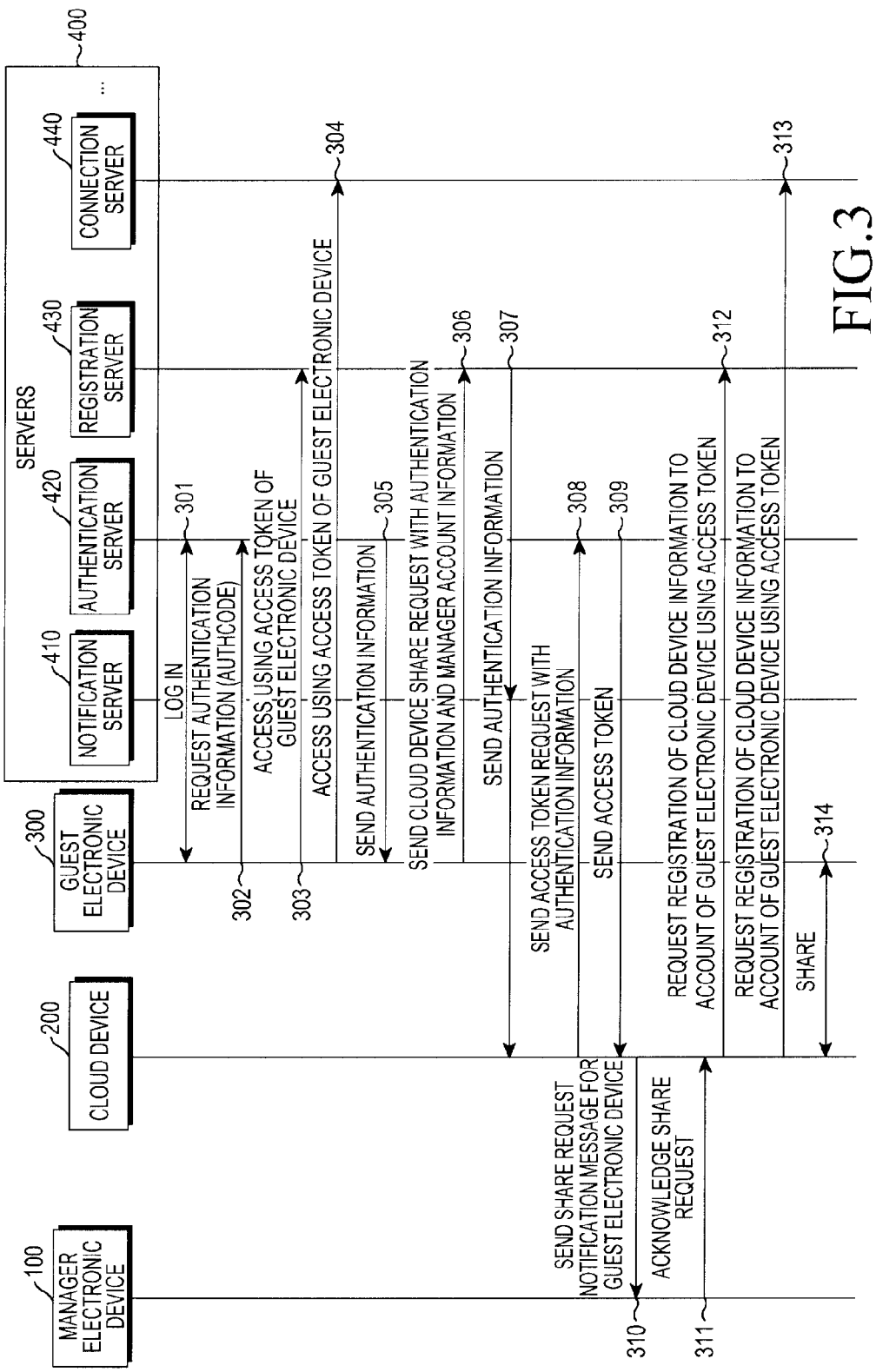
FIG. 3 is a diagram illustrating an example signal flow for an example sharing operation in accordance with aspects of the present disclosure.
Figure 4:
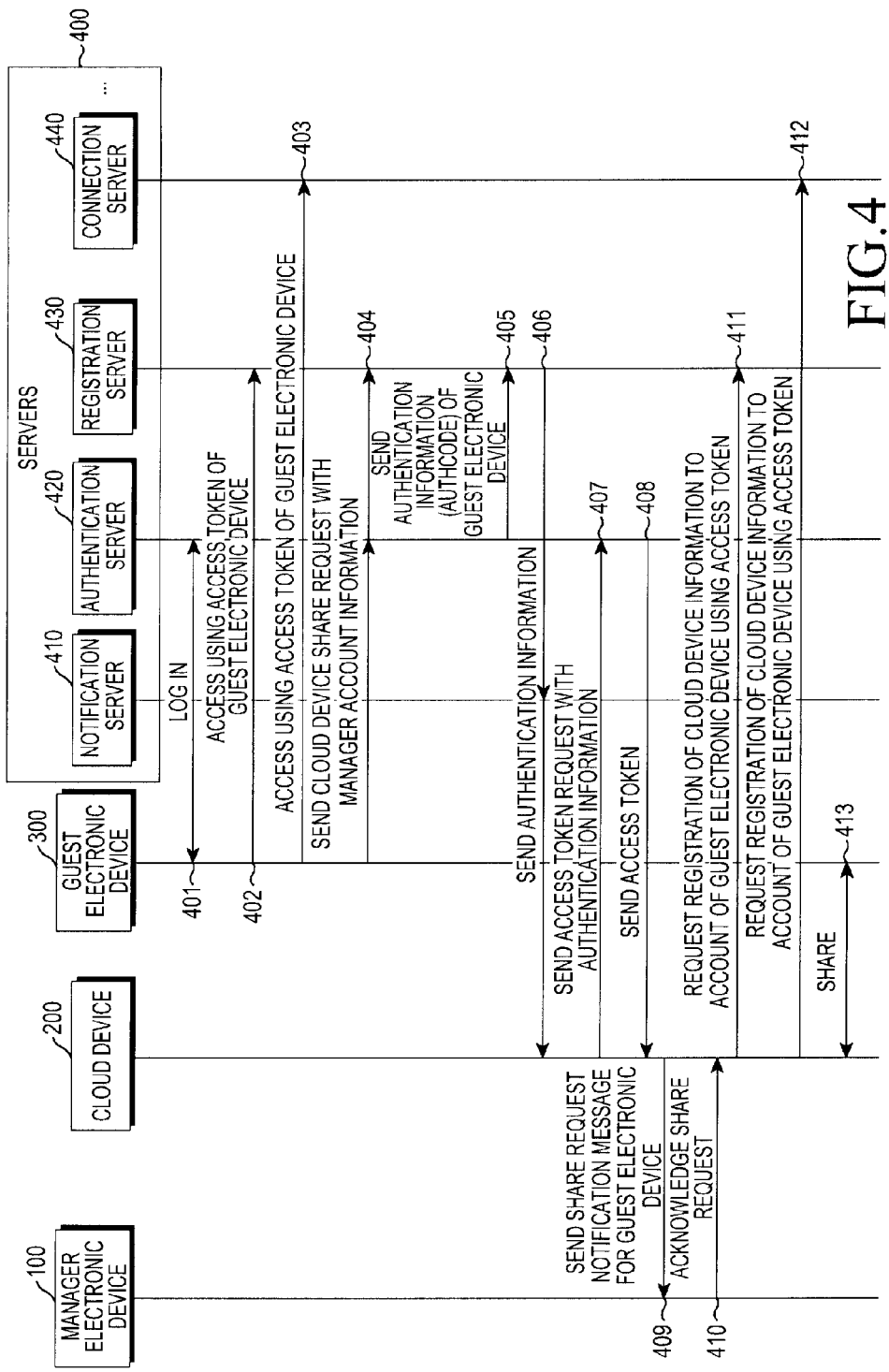
FIG. 4 is a diagram illustrating a further example signal flow for an example sharing operation in accordance with aspects of the present disclosure.
Figure 5:
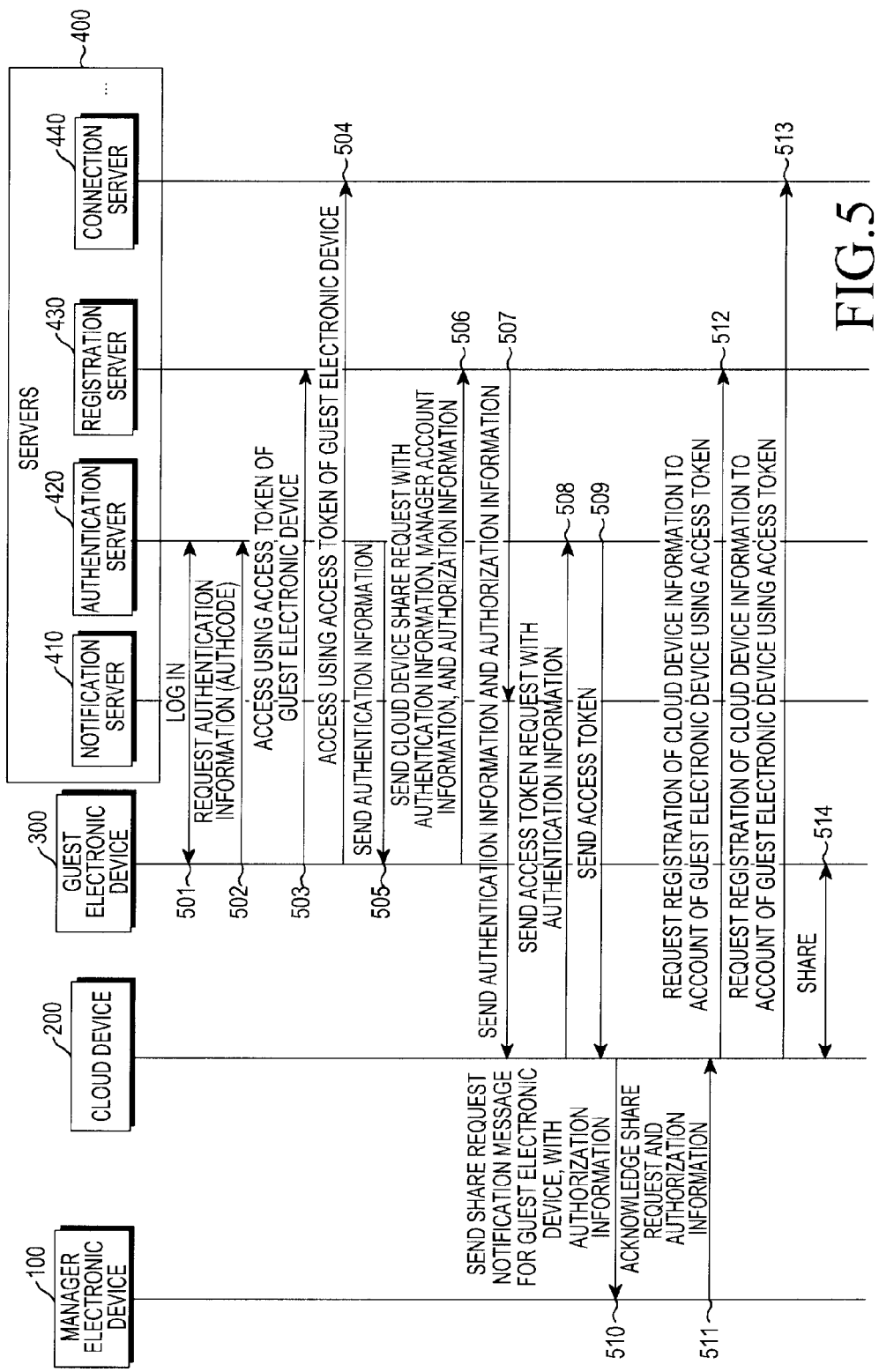
FIG. 5 is a diagram illustrating yet a further example signal flow for an example sharing operation in accordance with aspects of the present disclosure.
Figure 6:
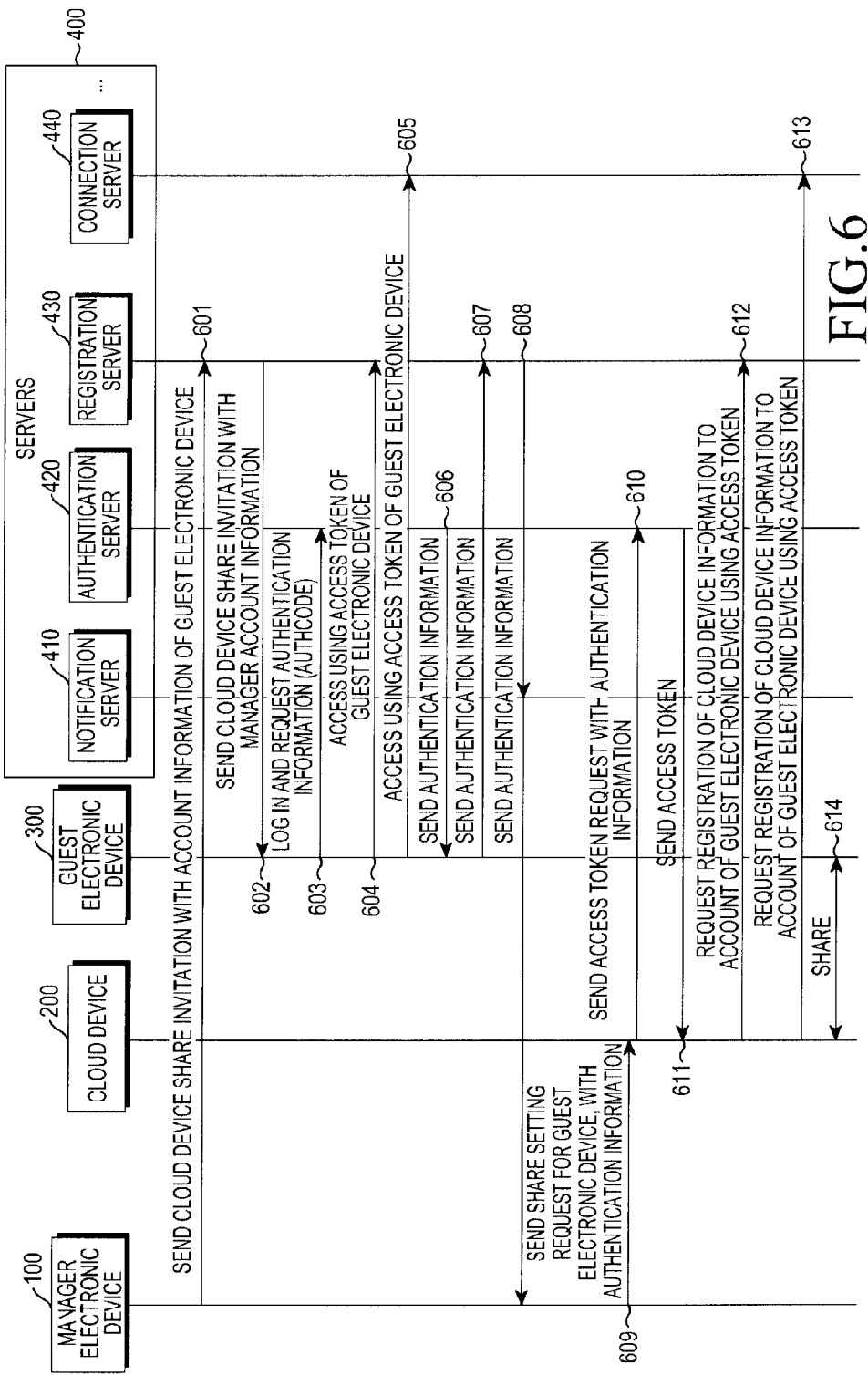
FIG. 6 is a diagram illustrating another example signal flow for an example sharing in accordance with aspects of the present disclosure.

Operations for sharing content in at least one personal cloud device will now be described with reference to FIGS. 3 to 6. FIGS. 3, 4, and 5 illustrate example operations for sharing a cloud device of a manager electronic device, when a guest electronic device requests a manager electronic device for cloud device access. FIG. 6 illustrates example operations for sharing a cloud device, when the manager electronic device invites a guest electronic device to share the cloud device. The operations for sharing a cloud device, when a guest electronic device requests a manager electronic device for access to the cloud device will first be described with reference to FIGS. 3, 4, and 5.

In FIG. 3, the guest electronic device 300 may log in to the authentication server 420 in operation 301 and may request authentication information (for example, Authcode) from authentication server 420 in operation 302. The guest electronic device 300 that has logged in to the authentication server 420 may request an access token for an account of the guest electronic device 300. The guest electronic device 300 may access the registration server 430 using the access token in operation 303 and may access the connection server 440 using the access token in operation 304. Once the guest electronic device 300 is connected to the registration server 430 and the connection server 440 in operations 303 and 304, the guest electronic device 300 may wait until the cloud device 200 uses the guest access token to connect to registration server 430 and the connection server 440, in order to automatically connect to the cloud device 200 when later requested. Waiting for the cloud device 200 to connect may be performed at any time after the guest electronic device 300 acquires the access token as well as after operation 302.

Upon receipt of a request for the authentication information from the guest electronic device 300 in operation 302, the authentication server 420 may obtain the authentication information and may transmit the authentication information to the guest electronic device 300 in operation 305. In one example, the authentication information may be an encrypted combination of the ID and password of the logged-in guest electronic device 300

Upon receipt of the authentication information from authentication server 420, guest electronic device 300 may transmit, to the registration server 430, a cloud device share request, the authentication information, and account information (for example, an ID, an e-mail address, or a phone number) associated with the manager electronic device 100 input by the user of guest electronic device 300, in operation 306.

The registration server 430 may identify at least one cloud device 200 registered to an account of the manager electronic device 100 based on the account information associated with the manager electronic device 100. Then the registration server 430 may transmit the authentication information associated with the guest electronic device 300 to the cloud device 200 through the notification server 410 in operation 307.

Upon receipt of the authentication information associated with the guest electronic device 300 from the registration server 430, the cloud device 200 may transmit an access token request together with the authentication information to the authentication server 420 in operation 308.

The authentication server 420 may verify the authentication information associated with the guest electronic device 300 received from the cloud device 200 and then transmit an access token to the cloud device 200 so that the cloud device 200 may register to the account of the guest electronic device 300 using the access token in operation 309.

Upon receipt of the access token from the authentication server 420, the cloud device 200 may transmit, to the manager electronic device 100, a share request notification message indicating that the guest electronic device 300 has requested sharing of the cloud device 200 in operation 310. The share request notification message may be transmitted to the manager electronic device via the notification server 410.

If the user of the manager electronic device 100 acknowledges the request of the guest electronic device 300 for sharing the cloud device 200, the manager electronic device 100 may notify the cloud device 200 of the acknowledgment of the share request through the notification server 410. On the other hand, if the user of the manager electronic device 100 rejects the request of the guest electronic device 300 for sharing the cloud device 200, the manager electronic device 100 may notify the cloud device 200 and the guest electronic device 300 of the rejection of the share request through the notification server 410.

Upon receipt of a share acknowledgment message from the manager electronic device 100 through the notification server 410 in operation 311, the cloud device 200 may request registration of information associated with the cloud device 200 to the account of the guest electronic device 300 in registration server 430 using its access token in operation 312. The registration server 430 may register the information associated with the cloud device 200 to the account of the guest electronic device 300 in response to the registration request. When the information associated with the cloud device 200 is completely registered to the account of the guest electronic device 300 in the registration server 430, the cloud device 200 may be displayed on the guest electronic device 300.

In operation 313, the cloud device 200 may request registration of the information associated with the cloud device 200 to the account of the guest electronic device 300 to the connection server 440 using the access token. The connection server 440 may register the information associated with the cloud device 200 to the account of the guest electronic device 300 in response to the registration request. When the information associated with the cloud device 200 is completely registered to the account of the guest electronic device 300 in the connection server 440, D2D communication may be conducted between the cloud device 200 and a plurality of devices registered to the account of the guest electronic device 300. Thus, the plurality of devices registered to the account of the guest electronic device 300 may access the cloud device 200.

Once the cloud device 200 is connected and registered to the registration server 430 and the connection server 440, any waiting guest electronic device (e.g., after connecting to the registration server 430 and the connection server 440 in operations 303 and 304) is automatically connected to the cloud device 200. Thereafter, access to the cloud device 200 is granted. Upon completion of an initial setup procedure for sharing the cloud device 200 between the guest electronic device 300 and the cloud device 200 in operations 312 and 313, the guest electronic device 300 may access the cloud device 200 in operation 314 such that at least some in cloud device 200 is shared with the guest.

Referring now to FIG. 4, a diagram illustrating a further example signal flow is shown. In FIG. 4, the guest electronic device 300 may log in to the authentication server 420 in operation 401. The logged-in guest electronic device 300 may request an access token for an account of the guest electronic device 300 from the authentication server 420 and receive the access token. The guest electronic device 300 may access the registration server 430 using the access token in operation 402 and may access the connection server 440 using the access token in operation 403. Once the guest electronic device 300 is connected to the registration server 430 and the connection server 440, it may automatically connect to the cloud device 200, when cloud device 200 connects to registration server 430 and connection server 440 with the guest access token and a share request is generated by guest electronic device 300. Guest electronic device 300 may wait for cloud device 200 to connect after acquiring the access token or after operation 401.

The guest electronic device 300 may transmit, to the authentication server 420 and the registration server 430, a cloud device share request together with account information (for example, an ID, an e-mail address, or a phone number) associated with the manager electronic device 100 input by the user of the guest electronic device 300 in operation 404.

Upon receipt of the cloud device share request from the guest electronic device 300, the authentication server 420 may obtain authentication information (for example, Authcode) associated with the logged-in guest electronic device 300 and transmit the detected authentication information to the registration server 430 in operation 405. The authentication information may be an encrypted combination of the ID and password of guest electronic device 300.

Upon receipt of the account information associated with the manager electronic device 100 and the cloud device share request from the guest electronic device 300, the registration server 430 identifies at least one cloud device 200 registered to an account of the manager electronic device 100 based on the account information associated with the manager electronic device 100. Then the registration server 430 may transmit the authentication information associated with the guest electronic device 300 received from the authentication server 420 to the cloud device 200 in operation 406. Subsequent operations 405 to 413 are performed in the same manner as operations 308 to 314 illustrated in FIG. 3 and thus will not be described herein.

Referring now to FIG. 5, a diagram illustrating yet a further example signal flow for an example sharing operation is shown. In FIG. 5, the guest electronic device 300 may log in to the authentication server 420 in operation 501 and may request authentication information (for example, Authcode) from its account in the authentication server 420 in operation 502. The guest electronic device 300 that has logged in to the authentication server 420 may request an access token for an account of the guest electronic device 300 to the authentication server 420 and receive the access token from the authentication server 420. The guest electronic device 300 may access the registration server 430 using the access token in operation 503 and may access the connection server 440 using the access token in operation 504. Once the guest electronic device 300 is connected to the registration server 430 and the connection server 440 in operations 503 and 504, the guest electronic device 300 may wait until the cloud device 200 is also connected to registration server 430 and connection server 440 using the access token of the guest electronic device account. Guest electronic device 300 may automatically connect to the cloud device 200 when later requested. Guest electronic device 300 may wait to connect to the cloud device 200 after it acquires the access token or after operation 502.

Upon receipt of a request for the authentication information from guest electronic device 300 in operation 502, the authentication server 420 may obtain and transmit the authentication information to the guest electronic device 300 in operation 505. The authentication information be an encrypted combination of the ID and password of the logged-in guest electronic device 300.

Upon receipt of the authentication information from authentication server 420, guest electronic device 300 may transmit, to the registration server 430, a cloud device share request, the authentication information, account information (e.g., an ID, an e-mail address, or a phone number input by the user of the guest device) associated with manager electronic device 100, and authorization information indicating a use range of the cloud device 200 requested by the user of the guest electronic device 300 in operation 506.

The registration server 430 identifies at least one cloud device 200 registered to an account of the manager electronic device 100 based on the account information associated with the manager electronic device 100. Then the registration server 430 may transmit the authorization information and the authentication information of the guest electronic device 300 to the cloud device 200 through the notification server 410 in operation 507.

In another example, after the log-in to the authentication server 420, the guest electronic device 300 may transmit, to the authentication server 420 and the registration server 430, the cloud device share request, the account information associated with the manager electronic device, and the authorization information. Then the registration server 430 may transmit the authentication information associated with the guest electronic device 300 received from the authentication server 420 and the authorization information received from the guest electronic device 300 to the cloud device 200.

Upon receipt of the authorization information and the authentication information of the guest electronic device 300 from the registration server 430, the cloud device 200 may transmit an access token request together with the authentication information to the authentication server 420 in operation 508.

The authentication server 420 may verify the authentication information associated with the guest electronic device 300 received from the cloud device 200 and then transmit an access token to the cloud device 200 so that the cloud device 200 may register to the account of the guest electronic device 300 using the access token in operation 509.

Upon receipt of the access token from the authentication server 420, the cloud device 200 may transmit, to the manager electronic device 100, a share request notification message indicating that the guest electronic device 300 has requested sharing of the cloud device 200 and the authorization information in operation 510. The share request notification message and the authorization information may be transmitted through the notification server 410. The user of the manager electronic device 100 may acknowledge, restrict, or extend the authorization information requested by the guest electronic device 300 and may provide information related to the acknowledgement, restriction, or extension of the authorization information to the guest electronic device 300.

If the user of the manager electronic device 100 acknowledges the authorization information and acknowledges the cloud device share request of the guest electronic device 300, the manager electronic device 100 may notify the cloud device 200 of the acknowledgement of the authorization information and the cloud device share request through the notification server 410.

On the other hand, If the user of the manager electronic device 100 changes (that is, restricts or extends) the authorization information and acknowledges the cloud device share request of the guest electronic device 300, the manager electronic device 100 may notify the cloud device 200 of the change of the authorization information and the acknowledgement through the notification server 410.

Upon receipt of a share ACK message together with information related to the acknowledgement or change (that is, restriction or extension) of the authorization information from the manager electronic device 100 through the notification server 410 in operation 511, the cloud device 200 may request registration of information associated with the cloud device 200 in the account of the guest electronic device 300 from the registration server 430 using the access token in operation 512. The registration server 430 may register the information associated with the cloud device 200 to the account of the guest electronic device 300 in response to the registration request. Upon completion of the information registration to the account of the guest electronic device 300, the cloud device 200 may be displayed on the guest electronic device 300.

In operation 513, the cloud device 200 may request registration of the information associated with the cloud device 200 in the account of the guest electronic device 300 from the connection server 440 using the access token. The connection server 440 may register the information associated with the cloud device 200 in the account of the guest electronic device 300 in response to the registration request. Upon completion of the information registration, D2D communication may be conducted between the cloud device 200 and a plurality of devices registered in the account of guest electronic device 300. Thus, the plurality of devices registered to the account of the guest electronic device 300 may access at least some content in the cloud device 200.

Once the cloud device 200 is connected and registered to the registration server 430 and the connection server 440, the aforementioned waiting guest electronic device 300 may automatically connect to the cloud device 200 and access at least some content in cloud device 200. Upon completion of an initial setup procedure for sharing the cloud device 200 between the guest electronic device 300 and the cloud device 200 in operations 512 and 513, the guest electronic device 300 may access content in the cloud device 200 as specified in the authorization information of operation 514.

Now a description will be given of an example operation for sharing a cloud device, when a manager electronic device invites a guest electronic device to share the cloud device, with reference to FIG. 6. In FIG. 6, manager electronic device 100 may transmit, to the registration server 430, a cloud device share invitation for the guest electronic device 300 together with account information (for example, an ID, an e-mail address, or a phone number) associated with the guest electronic device 300 input by the user of the manager electronic device 100 in operation 601.

Upon receipt of the cloud device share invitation from the manager electronic device 100, the registration server 430 may transmit, to the guest electronic device 300, the cloud device share invitation together with account information associated with the manager electronic device 100 in operation 602.

Upon receipt of the cloud device share invitation together with the account information associated with the manager electronic device 100 from the registration server 430, the guest electronic device 300 may log in to the authentication server 420 and request authentication information (for example, Authcode) in operation 603. The logged-in guest electronic device 300 may request an access token for an account of the guest electronic device 300 from the authentication server 420. The guest electronic device 300 may access the registration server 430 using the access token in operation 604 and may access the connection server 440 using the access token in operation 605. Once the guest electronic device 300 is connected to the registration server 430 and the connection server 440 in operations 604 and 605, the guest electronic device 300 may wait until the cloud device 200 connects to registration server 430 and connection server 440 using the access token of guest electronic device 300. Once the cloud device 200 connects, guest electronic device 300 may automatically connect to cloud device 200 when guest electronic device 300 receives an invitation. Guest electronic device 300 may begin waiting when it acquires the access token or after operation 603.

Upon receipt of a request for the authentication information from the guest electronic device 300 in operation 603, the authentication server 420 may obtain the authentication information and may transmit the authentication information to the guest electronic device 300 in operation 606. The authentication information may be an encrypted combination of the ID and password of the logged-in guest electronic device 300

Upon receipt of the authentication information from the authentication server 420, the guest electronic device 300 may transmit the authentication information to the registration server 430 in response to the cloud device share invitation in operation 607.

Upon receipt of the authentication information from the guest electronic device 300, the registration server 430 may transmit the authentication information associated with the guest electronic device 300 to the manager electronic device 100 through the notification server 410 in operation 608.

Upon receipt of the authentication information associated with the guest electronic device 300 from the registration server 430, the manager electronic device 200 may transmit, to the cloud device 200, a share setting request for the guest electronic device 300 and the authentication information through the notification server 410 in operation 609.

Upon receipt of the share setting request for the guest electronic device 300 and the authentication information from the manager electronic device 100, the cloud device 200 may transmit an access token request together with the authentication information associated with the guest electronic device 300 to the authentication server 420 in operation 610.

The authentication server 420 may verify the authentication information associated with the guest electronic device 300 received from the cloud device 200 and then transmit an access token to the cloud device 200 so that the cloud device 200 may register to the account of the guest electronic device 300 using the access token in operation 611.

Upon receipt of the access token from authentication server 420, the cloud device 200 may request registration of information associated with the cloud device 200 to the account of the guest electronic device 300 in the registration server 430 using the access token in operation 612. The registration server 430 may register the information associated with the cloud device 200 in the account of the guest electronic device 300 in response to the registration request. Upon completion of the information registration, the cloud device 200 may be displayed on the guest electronic device 300.

In operation 613, the cloud device 200 may request registration of the information associated with the cloud device 200 to the account of the guest electronic device 300 in connection server 440 using the access token. The connection server 440 may register the information associated with the cloud device 200 to the account of the guest electronic device 300 in response to the registration request. Upon completion of the information registration, D2D communication may be conducted between the cloud device 200 and a plurality of devices registered to the account of the guest electronic device 300. Thus, the plurality of devices registered to the account of the guest electronic device 300 may access at least some content in cloud device 200.

Once the cloud device 200 is connected and registered to the registration server 430 and the connection server 440, the aforementioned waiting guest electronic device 300 may automatically connect to cloud device 200 to access at least some content in cloud device 200 in operation 614.

Figure 7:
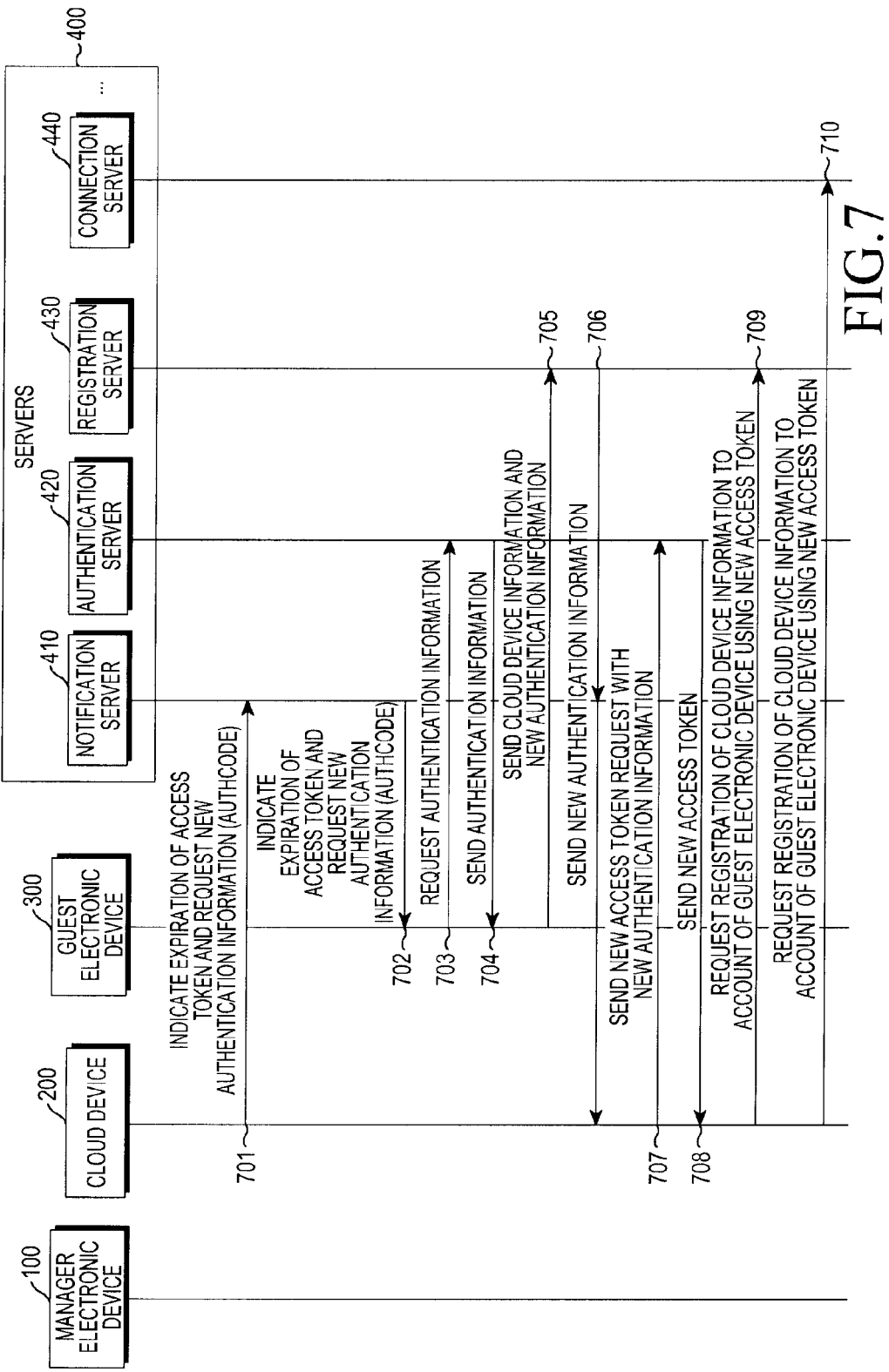
FIG. 7 is a diagram illustrating an example signal flow for an example token access update operation in accordance with aspects of the present disclosure.

Referring now to FIG. 7, a diagram illustrating another example signal flow for an example token access update operation is depicted. In FIG. 7, if there has been inactivity (for example I/O operation) for a predetermined time period (for example, a month) after cloud device 200 acquires an access token for an account of the guest electronic device 300, the access token may expire in accordance with a policy of the authentication server 420. Upon expiration of the access token of the account of the guest electronic device 300, the user of the manager electronic device 100 or the user of the guest electronic device 300 cannot update the expired access token in the cloud device 200.

Upon expiration of a guest device account access token, the cloud device 200 may notify notification server 410 of the expiration and transmit a request for new authentication information (for example, Authcode) and information associated with the cloud device 200 to the notification server 410 in operation 701. In operation 702, notification server 410 may transmit, to the guest electronic device 300, a request for new authentication information and information associated with cloud device 200. Thus, notification server 410 may notify guest electronic device 300 of the expiration. Since an additional registration ID for each device may be used between devices that have been connected at least once, direct communication may be conducted between the cloud device 200 and the notification server 410 in operation 701 and between the notification server 410 and the guest electronic device 300.

Upon receipt of the information associated with cloud device 200 and the request for the new authentication information from cloud device 200 through the notification server 410, guest electronic device 300 may identify the cloud device 200 based on the information associated with the cloud device 200. Then the guest electronic device 300 may log in to the authentication server 420 and request authentication information from authentication server 420 in operation 703. Upon receipt of the request for authentication information from guest electronic device 300, authentication server 420 may obtain and transmit the authentication information to guest electronic device 300 in operation 704. The authentication information may be an encrypted combination of the ID and password of the logged-in guest electronic device 300.

Upon receipt of the authentication information, the guest electronic device 300 may transmit, to the registration server 430, the new authentication information and the information associated with the cloud device 200 in operation 705.

The registration server 430 identifies the cloud device 200 based on the information associated with the cloud device 200. Then the registration server 430 may transmit the new authentication information associated with the guest electronic device 300 to the cloud device 200 through the notification server 410 in operation 706.

Upon receipt of the new authentication information, cloud device 200 may transmit an access token request together with the new authentication information to the authentication server 420 in operation 707. The authentication server 420 may verify the new authentication information associated with the guest electronic device 300 and then transmit a new access token to the cloud device 200 so that the cloud device 200 may conduct D2D communication with a plurality of electronic devices registered to the account of the guest electronic device 300 in operation 708.

Upon receipt of the new access token from the authentication server 420, the cloud device 200 may request registration of the information associated with the cloud device 200 to the account of guest electronic device 300 in registration server 430 using the new access token in operation 709. The registration server 430 may register the information associated with the cloud device 200 to the account of the guest electronic device 300 in response to the registration request. When the information associated with the cloud device 200 is registered to the account of guest electronic device 300 in the registration server 430, the cloud device 200 may be displayed on the guest electronic device 300.

In operation 710, the cloud device 200 may request registration of the information associated with the cloud device 200 to the account of the guest electronic device 300 in connection server 440 using the new access token. The connection server 440 may register the information associated with the cloud device 200 to the account of the guest electronic device 300 in response to the registration request. When the information associated with the cloud device 200 is registered to the account of the guest in the connection server 440, D2D communication may be conducted between the cloud device 200 and a plurality of devices registered to the account of the guest electronic device 300. Thus, the plurality of devices registered to the account of the guest electronic device 300 may access at least some content in the cloud device 200 again.

Even upon expiration of a valid duration of an access token in the cloud device 200, cloud device 200 may acquire a new access token using new authentication information received from the guest electronic device 300 to thereby maintain the cloud device sharing service active.

The proposed system, apparatus, and method for sharing an electronic device may be implemented as computer-readable code in a computer-readable recording medium. The computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description, the system, apparatus, and method for sharing a cloud device of the present disclosure may enable sharing of a personal cloud device without a temporal or spatial constraint.

While the disclosure has been shown and described with reference to certain examples, it will be understood by those skilled in the art that various changes in form and details may be made therein without departing from the spirit and scope of the disclosure as defined by the appended claims and their equivalents.

What is claimed is:

1. An electronic device comprising:
   a memory to store authentication information; and
   a controller, coupled to the memory, configured to:
   detect an input of account information associated with a first electronic device;
   transmit, to an external device, a share request comprising a request to access at least some content in a second electronic device;
   transmit, to the external device, the account information associated with the first electronic device;

access the second electronic device such that the second electronic device shares at least some content therein, when an acknowledgement of the share request by the first electronic device is detected; and transmit authorization information that indicates a use range of the second electronic device to the external device, the use range being indicative of the content that the second electronic device shares with the electronic device.

2. The electronic device of claim 1, wherein the account information associated with the first electronic device includes at least one of an Identifier (ID), an e-mail address, or a phone number associated with the first electronic device.

3. The electronic device of claim 1, wherein the controller to further detect receipt of a change in the authorization information from the second electronic device, when the first electronic device changes the authorization information.

4. The electronic device of claim 1, wherein the controller to further transmit a request to the external device for at least one of authentication information and an access token of an account associated with the electronic device, while the electronic device is logged in to the external device.

5. The electronic device of claim 1, wherein the controller to further:
   detect an incoming access token for an account associated with the electronic device from the external device;
   access the external device using the access token; and
   access at least some content in the second electronic device, when acknowledgement of the share request by the first electronic device is detected and the electronic device is connected to the external device.

6. The electronic device of claim 1, wherein the controller to further transmit authentication information associated with the electronic device as an acknowledgement of a share invitation, when receipt of the share invitation and account information associated with the first electronic device is detected.

7. The electronic device of claim 6, wherein while the electronic device is logged in to the external device, the controller controls transmission of a request for at least one of the authentication information or an access token for an account of the electronic device to the external device.

8. The electronic device of claim 6, wherein the controller to further:
   detect receipt of an access token for an account associated with the electronic device from the external device;
   access the external device using the access token; and
   access at least some content in the second electronic device, when the second electronic device is shared while the electronic device is connected to the external device.

9. The electronic device of claim 1, wherein the first electronic device is a terminal and wherein the second electronic device is a terminal, and wherein accessing the second electronic device such that the second electronic device share at least some content, further comprises access the second electronic device such that the second electronic device directly shares the at least some content with the electronic device.

10. A method for sharing an electronic device, the method comprising:
    detecting an input of account information associated with a first electronic device;
    transmitting, to an external device, a share request comprising a request to access at least some content in a second electronic device;
    transmitting, to the external device, the account information associated with the first electronic device; and
    accessing the second electronic device such that the second electronic device shares at least some content therein, when an acknowledgement of the share request by the first electronic device is detected; and
    transmitting information that indicates a use range of the second electronic device to the external device, the use range being indicative of the content that the second electronic device shares.

11. The method of claim 10, wherein the account information associated with the first electronic device includes at least one of an Identifier (ID), an e-mail address, or a phone number associated with the first electronic device.

12. The method of claim 10, further comprising detecting receipt, from the second electronic device, of a change in authorization information, when the first electronic device changes the authorization information.

13. The method of claim 10, further comprising:
    logging in to the external device;
    transmitting a request to the external device for at least one of authentication information and an access token of an account associated with a electronic device, while the electronic device is logged in to the external device; and
    detecting receipt from the external device of the at least one of the authentication information and the access token.

14. The method of claim 10, further comprising:
    detecting an incoming access token for an account associated with a electronic device from the external device;
    accessing the external device using the access token; and
    accessing at least some content in the second electronic device, when acknowledgement of the share request by the first electronic device is detected and the electronic device is connected to the external device.

15. The method of claim 10, further comprising transmitting authentication information associated with an electronic device as an acknowledgement of a share invitation, when receipt of the share invitation and account information associated with the first electronic device is detected.

16. The method of claim 15, further comprising:
    logging in to the external device; and
    requesting at least one of the authentication information and an access token for an account of the electronic device to the external device, while the electronic device is logged in to the external device.

17. The method of claim 15, further comprising:
    detecting receipt from the external device of an access token for an account associated with the electronic device;
    accessing the external device using the access token; and
    accessing at least some content in the second electronic device, when the second electronic device is shared while a guest electronic device is connected to the external device.

* * * * *

UNITED STATES PATENT AND TRADEMARK OFFICE
CERTIFICATE OF CORRECTION

| | | |
|---|---|---|
| PATENT NO. | : 9,413,741 B2 | Page 1 of 1 |
| APPLICATION NO. | : 14/462789 | |
| DATED | : August 9, 2016 | |
| INVENTOR(S) | : Tae-Wook Kang et al. | |

It is certified that error appears in the above-identified patent and that said Letters Patent is hereby corrected as shown below:

In the claims,

Column 18, Claim 10, Lines 5-6 should read as follows:
--…electronic device; accessing the…--

Signed and Sealed this
Sixth Day of September, 2016

Michelle K. Lee
*Director of the United States Patent and Trademark Office*